US008733510B2

(12) United States Patent
Haase

(10) Patent No.: US 8,733,510 B2
(45) **Date of Patent: *May 27, 2014**

(54) EXTERIOR MECHANICAL INTERLOCK FOR A LINEAR ACTUATOR

(75) Inventor: Gunnar Haase, Wedel (DE)

(73) Assignee: Airbus Operations GmbH (DE)

( * ) Notice: Subject to any disclaimer, the term of this patent is extended or adjusted under 35 U.S.C. 154(b) by 945 days.

This patent is subject to a terminal disclaimer.

(21) Appl. No.: 11/991,769

(22) PCT Filed: Aug. 31, 2006

(86) PCT No.: PCT/EP2006/008532

§ 371 (c)(1),
(2), (4) Date: Feb. 9, 2009

(87) PCT Pub. No.: WO2007/028543

PCT Pub. Date: Mar. 15, 2007

(65) Prior Publication Data

US 2009/0194641 A1 Aug. 6, 2009

Related U.S. Application Data

(60) Provisional application No. 60/714,807, filed on Sep. 7, 2005.

(30) Foreign Application Priority Data

Sep. 7, 2005 (DE) ........................ 10 2005 042 510

(51) Int. Cl.
*F16D 63/00* (2006.01)

(52) U.S. Cl.
USPC ............................................ 188/68; 188/300

(58) Field of Classification Search
USPC ......... 188/68, 300, 77 W, 67, 69, 151 A, 265, 188/382
See application file for complete search history.

(56) References Cited

U.S. PATENT DOCUMENTS 2,932,282 A 4/1960 McKinley et al.
2,967,512 A 1/1961 Born (Continued)

FOREIGN PATENT DOCUMENTS

CN 2316532 4/1999
DE 86 33 001 U1 2/1987

(Continued)

OTHER PUBLICATIONS

International Search Report, PCT/EP2006/008532.

*Primary Examiner* — Xuan Lan Nguyen
(74) *Attorney, Agent, or Firm* — Lerner, David, Littenberg, Krumholz & Mentlik, LLP

(57) ABSTRACT

A locking mechanism, which permits fixation to a piston rod of a linear actuator relatively to a cylinder of the actuator, as well as a linear actuator equipped with such a locking mechanism as well as to an aircraft with at least one linear activator that is equipped with the locking mechanism. The locking mechanism includes a plurality of first positive locking elements which are arranged lengthwise with the outside circumference of the cylinder and in certain distances to one another and at least one second positive locking element, which is moved together with the piston rod upon activation of the linear actuator and thus passes a segment of the cylinder. The at least one second positive locking element is positively engageable with one of the plurality of first locking elements at discrete positions of the cylinder lengthwise, by which the piston rod is fixed relatively to the cylinder.

10 Claims, 7 Drawing Sheets

(56) References Cited

U.S. PATENT DOCUMENTS

| | | | | | |
|---|---|---|---|---|---|
| 4,586,425 | A * | 5/1986 | Redman et al. | 91/45 |
| 4,840,031 | A | 6/1989 | Hribar | |
| 4,840,398 | A | 6/1989 | Matthias et al. | |
| 2004/0211313 | A1 * | 10/2004 | Yamaguchi | 92/15 |
| 2004/0245386 | A1 | 12/2004 | Huynh | |

FOREIGN PATENT DOCUMENTS

| | | | |
|---|---|---|---|
| DE | 37 32 562 | C1 | 11/1988 |
| GB | 1586621 | | 3/1981 |
| JP | 33-745 | | 1/1958 |
| JP | 02300508 | A | 12/1990 |
| JP | 05064047 | A | 3/1993 |
| JP | 10-026104 | A | 1/1998 |
| RU | 2165039 | C1 | 4/2001 |
| RU | 2001127505 | | 11/2001 |
| WO | 9636555 | | 11/1996 |
| WO | 03/064864 | A1 | 8/2003 |

* cited by examiner

EXTERIOR MECHANICAL INTERLOCK FOR A LINEAR ACTUATOR

This application claims the benefit of the filing date of U.S. Provisional Patent Application No. 60/714,807 filed 7 Sep. 2005 and of German Patent Application No. 10 2005 042 510.0 filed 7 Sep. 2005, the disclosures of which are hereby incorporated herein by reference.

FIELD OF THE INVENTION

The present invention relates to a design layout of a piston cylinder unit in general. In particular, the present invention relates to a locking mechanism with which the piston rod of a linear actuator is fixed (festgelegt) relatively to the cylinder of the same, thus to such a locking mechanism equipped linear actuator, with which the horizontal stabilizer of an aircraft, like for example a horizontal tail, can be shifted in its tilt in relation to the aircraft body. Ultimately the present invention relates to an aircraft, which is equipped with such a linear actuator outfitted with a locking mechanism according to the invention, with which the horizontal stabilizer of an aircraft, like for example a horizontal tail, can be shifted in its tilt in relation to the aircraft body.

TECHNOLOGICAL BACKGROUND

Usually aircraft tails which are trimmable in its tilt to the aircraft body, are trimmed by the use of trapezoid thread spindles or ballscrews, that is to alter its tilt in relation to the aircraft body. Such actuators used for alteration of the tilt of aircraft tails in relation to the aircraft body are usually called "Trimmable Horizontal Stabilizer Actuator" (short form: THSA) in the field of aerospace technology, which term will be used in the present invention. To hold a load statically, trapezoid thread spindles are constructed as self-locking and ballscrews as retarded.

Though it would be desirable to use pneumatic or hydraulic piston cylinder units as Trimmable Horizontal Stabilizer Actuators, normally this is not possible due to the fact that in case of a malfunction of the pressure feed of such a piston cylinder unit, the load can no longer be held in position. Though final position locking mechanisms like the so-called "Krüger Actuator" are known, such a final position locking mechanism is unable to fix the piston cylinder unit in an arbitrary position. Furthermore there are different known techniques for holding a piston cylinder unit in an arbitrary position, however these systems, as a general rule, are based on a non-positive connection, which is carried out by a friction coupling in the interior of the cylinder, like in the case of the so called "Hähnchen Zylinder" by the company Hänchen.

With such a non-positive locking mechanism, only comparatively small static retention forces can be generated, which are considerably lower than the actuating power created by the piston cylinder unit itself. Thus, the known solutions for locking of a linear actuator can only securely lock the same in one defined position or apply only minor retention forces (like for example with a non-positive locking mechanism).

Furthermore, the described known locking solutions are only poorly or not at all inspectable, as they are built into the interior of the piston cylinder unit. Due to the aforementioned disadvantages, piston cylinder units cannot be considered as Trimmable Horizontal Stabilizer Actuators.

SUMMARY OF THE INVENTION

Starting from the aforementioned disadvantages, which prohibit the use of a piston cylinder unit as a Trimmable Horizontal Stabilizer Actuator, there may be a need to provide an implementation in which a linear actuator, like for example a piston cylinder unit, can be used reliably as a Trimmable Horizontal Stabilizer Actuator.

If in the context of the present invention it is spoken of a linear actuator, one has to subsume all piston cylinder units, which are driven for example by hydraulic, pneumatic or electrical energy, like for example generated by magnetic fields. In particular, linear actuators are to be understood as hydraulic or pneumatic cylinders.

The need my be met by a locking mechanism, with which the piston rod of a linear actuator can be fixed relatively (festgelegt) to the cylinder of the same, by the use of a linear actuator equipped with such a locking mechanism so that a horizontal stabilizer of an aircraft, like for example a horizontal tail, may be adjusted in its tilt in relation to the aircraft body and by an aircraft which is equipped with a linear actuator with such a locking mechanism according to an exemplary embodiment, so that a horizontal stabilizer of an aircraft, like for example a horizontal tail, may be adjusted in its tilt in relation to the aircraft body.

According to a first embodiment, the locking mechanism according to the present invention is able to fix the piston rod of a linear actuator relatively to the cylinder of the same. The locking mechanism according to the first embodiment comprises a plurality of first positive locking elements which are arranged lengthwisely on the outside circumference of the cylinder and have a predetermined spacing to each other. The locking mechanism further comprises at least one second positive locking element which moves together with the piston rod when the linear actuator is activated, and passes a portion of the cylinder. The simultaneous movement of the second positive locking element with the piston rod may be achieved by at least indirectly connecting the second positive locking element to the piston rod. To fix the piston rod relatively to the cylinder the at least one second positive locking element is formed to engage with one of the plurality of first positive locking elements at one discrete position of the cylinder lengthwisely. Due to the aforementioned fact that the second positive locking element is at least indirectly connected to the piston rod, further operating of the linear actuator may be prevented due to the attained positive locking, so that in case of a malfunction of the energy supply to the linear actuator the last set position of the linear actuator may be upheld by using the locking element according to the present invention.

Alternatively to this first embodiment, it may also be possible to reverse the relationship. In this case the locking element comprises, according to an alternative second embodiment, at least one first positive locking element, which is arranged on the outside circumference of the cylinder in the area of the exit of the piston rod. The locking mechanism further comprises a plurality of second locking elements which are moving together with the piston rod when the linear actuator is operated, thus passing the first positive locking element.

The simultaneous movement of the second positive locking elements together with the piston rod may be achieved by at least indirectly connecting the second positive locking elements to the piston rod. To fix the piston rod relatively to the cylinder the at least one first positive locking element is constructed to engage positively with one of the plurality of second positive locking elements. Due to the aforementioned fact that the second positive locking elements are at least indirectly connected to the piston rod, further operation of the linear actuator may be prevented, due to the attained positive locking, so that in case of a malfunction of the energy supply to the linear actuator the last set position of the linear actuator may be upheld by using the locking element according to the present invention.

The described mechanical locking element is usable with all kinds of linear actuators, for example hydraulic or pneumatic cylinders or electrically charged piston cylinder units, which have a cylindrical shape and which are to be mechanically locked securely in certain discrete positions. Though a starting point for the present invention may be to provide a realization for a Trimmable Horizontal Stabilizer Actuator which possibly permits to use a piston cylinder unit as Trimmable Horizontal Stabilizer Actuator, the locking mechanism according to the present invention may of course be used for other flight control actuators like for example actuators for flaps, slats or spoilers. Furthermore, the locking mechanism according to the present invention may be used for other aviation related applications like for example door actuators.

With the development of the locking mechanism according to the present invention linear actuators (electrical, hydraulic, or pneumatic) may be used in a completely new area of application, enabling the use of piston cylinder units as Trimmable Horizontal Stabilizer Actuators. Due to the mechanical locking mechanism the linear actuator may be capable of securely holding the last set position in case of a malfunction of the power input, for that it may not need any additional energy, which will be described in greater detail in the following. Unlike the known non-positive locking mechanisms, a linear actuator equipped with a locking mechanism according to the present invention having adequate dimensioning of the locking mechanism, may be able to securely hold loads in the order of magnitude of the actuating power generated by the linear actuator itself.

Since the locking mechanism according to the present invention is predominantly located on the outside circumference of the linear actuator and/or its cylinder, the locking mechanism may be examined, maintained, tested and, if necessary, easily repaired. Since the locking mechanism itself, in the case of a malfunction in the power input to the linear actuator, transfers forces from the cylinder to the piston rod, it may constitute a second load path, trough which in case of a power failure the load of the linear actuator may be transferred safely.

Below, special embodiments of the firstly described first embodiment of the locking mechanism according to the present invention will be explained. These special embodiments can self-evidently be used, with minor adaptations, in a similar way on the aforementioned second embodiment of the locking mechanism according to the present invention.

In order to positively lock the at least one second positive locking element with one of the plurality of first positive locking elements, the at least one second positive locking element is designed in a way to either be able to take a locked or alternatively an unlocked position. In the locked position, the at least one second positive locking element is engaged with one of the plurality of first positive locking elements, whereas in the open position the positive locking is suspended.

In order to not have to supply additional energy to move the at least one second positive locking element to its locked state, the at least one second locking element is designed so that it creates a reset force which always tries to move it from the unlocked position to the locked position. To counteract this reset force, so that the at least one second positive locking element does not move to its locked position at arbitrary points in time, the locking mechanism according to the present invention additionally comprises an unlocking actuator, which is designed and arranged in such a way that with its activation the at least one second positive locking element is held in its unlocked position counteracting the reset force.

Like suggested before, no additional energy may be needed in order to activate the locking mechanism in case of a failure of the power input. This may be realized in a way in which the activation of the unlocking actuator is carried out by an energy input that is coupled with the one by which the linear actuator is operated, which may implicate that in case of a failure of the power input of the linear actuator the at least one second positive locking element, due to its reset force, may move to its locked position. In the case of, for example, a hydraulically operated linear actuator, an also hydraulically operated unlocking actuator can be used, wherein the admission of both actuators is coupled in such a way that with the failure of the main energy input of the linear actuator the energy input of the unlocking actuator fails as well, resulting in the at least one second locking element automatically moving to its locked position at the time of the energy failure thus arresting the last set position of the linear actuator.

One concrete design of the plurality of first positive locking elements can be realized, for example, by a plurality of grooves, which surround the cylinder on its external peripheral side. Here, the plurality of grooves can be integrally worked into the external peripheral side of the cylinder or built onto a separate tube joining sleeve (Rohrhülse), which inside diameter is matched to the external diameter of the cylinder in such a way that the tube jointing sleeve can be attached onto the latter.

Like explained before, the at least one second positive locking element is attached indirectly to the piston rod to be able to move together with it. This indirect connection can, for example, be accomplished by a dip pipe (Tauchrohr), which is connected to an end of the piston rod that is situated outside of the cylinder and which concentrically surrounds the piston rod in a certain distance. This distance is dimensioned in such a way that, while operating the linear actuator, the cylinder may immerse into this certain distance. In order to fix the dip pipe and thus the piston rod relatively to the cylinder, in the area where the dip pipe and the cylinder overlap, the dip pipe is accepting the at least one second positive locking element. The connection between the dip pipe and the open end of the piston rod can be realized in such a way that the dip pipe on one end exhibits a closed front wall at which said open end of the piston rod can be attached to the inside of the dip pipe, so that in combination they form some sort of jacket (Glocke).

A simple design of the at least one second positive locking mechanism can be realized in such a way that this positive locking mechanism is designed as a spring washer clamp (Federringklemme), which is dimensioned in such a way that in its locked position it is positively locked with one of the plurality of grooves. Alternatively, it would be possible as well to provide the second locking mechanism as multiple small piston cylinder units, which are, for example, arranged on the outside of the cylinder and which piston rods, driven by a spring force, engage with the grooves of the cylinder in case of an energy failure.

For the incorporation of a second positive locking element, which is designed as a spring washer clamp, within the dip pipe, it is possible to form an annular gap in the area where the cylinder and the locking mechanism overlap, which accommodates the spring washer clamp in its unlocked position.

According to a further aspect of the present invention, it is intended to use a linear actuator having a previously described locking mechanism as a Trimmable Horizontal Stabilizer Actuator. Such a usage of linear actuators was not possible until now, due to the fact that known interlock mechanisms for linear actuators could only impose minor retention forces or were even unable to be locked in arbitrary positions.

According to a further aspect of the present invention, an aircraft with at least one linear actuator, having a locking mechanism that exhibits some of the aforementioned features, is provided.

BRIEF DESCRIPTION OF THE DRAWINGS

Below the present invention is explained further in reference to the attached drawings, which only represent an exemplary embodiment of the invention. It shows.

In all figures, identical or corresponding elements are identified with identical or corresponding reference signs. The figures are not drawn to scale, however they can depict qualitative proportions.

DESCRIPTION OF AN EXEMPLARY EMBODIMENT

Below, the locking mechanism according to the present invention is described exemplarily by a hydraulic linear actuator 6, though the functional principle of the present invention can be transferred accordingly to a pneumatically or by any other means operated linear actuator with cylindrical structural shape.

Figure 1:
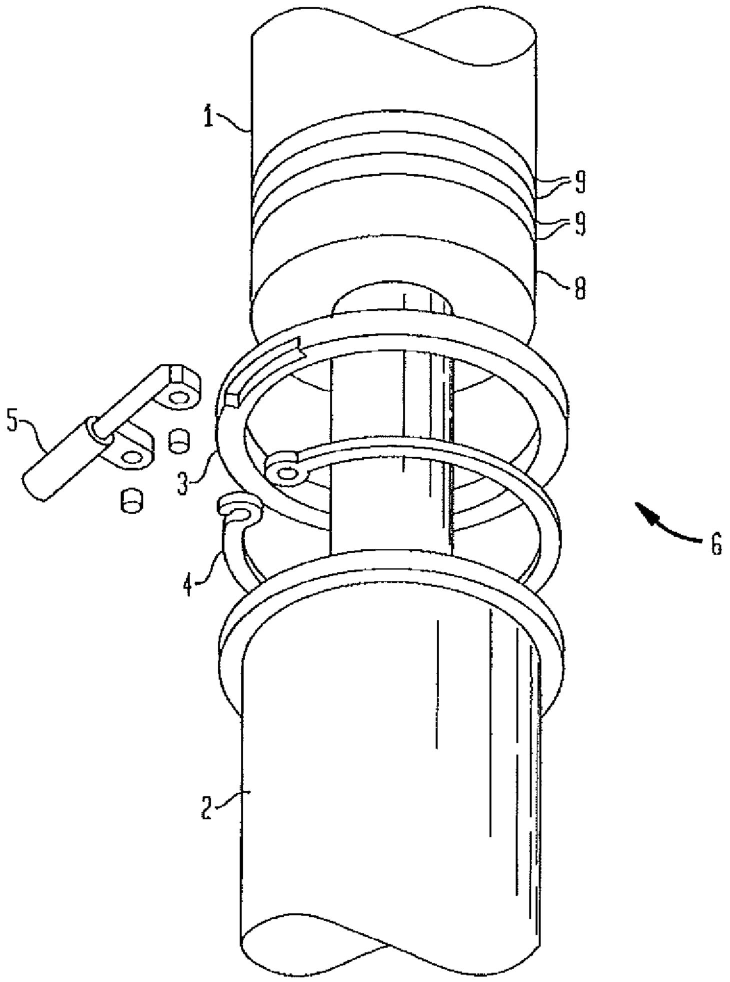
FIG. 1 is an exploded view of a locking mechanism according to an exemplary embodiment of the present invention.
Figure 2A:
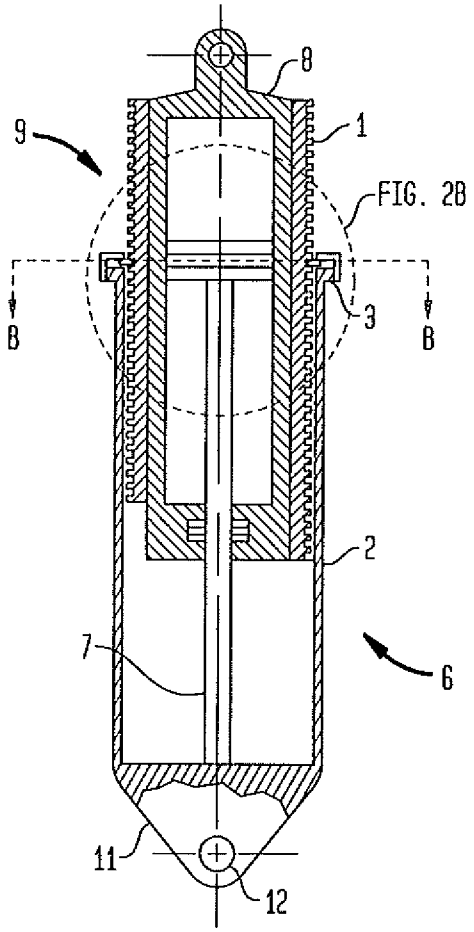
FIG. 2A shows a longitudinal section through a piston cylinder unit equipped with a locking mechanism according to an exemplary embodiment of the present invention.
Figure 2B:
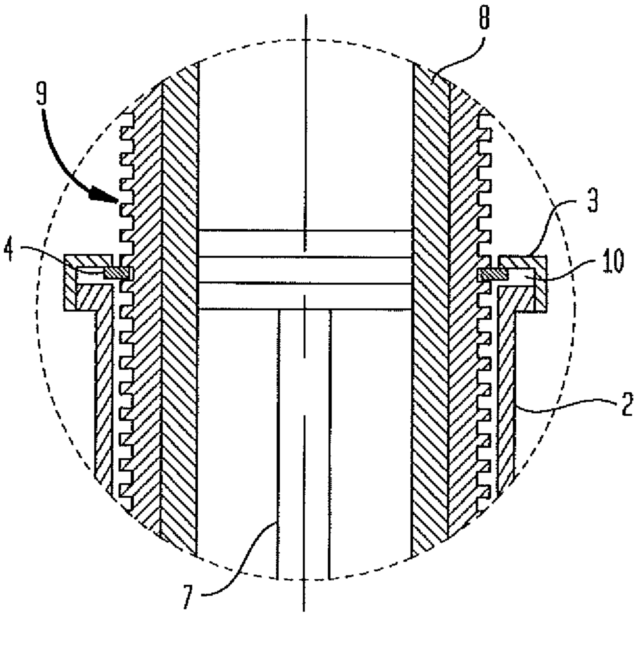
FIG. 2B shows detail A of FIG. 2A in an enlarged illustration.
Figure 3:
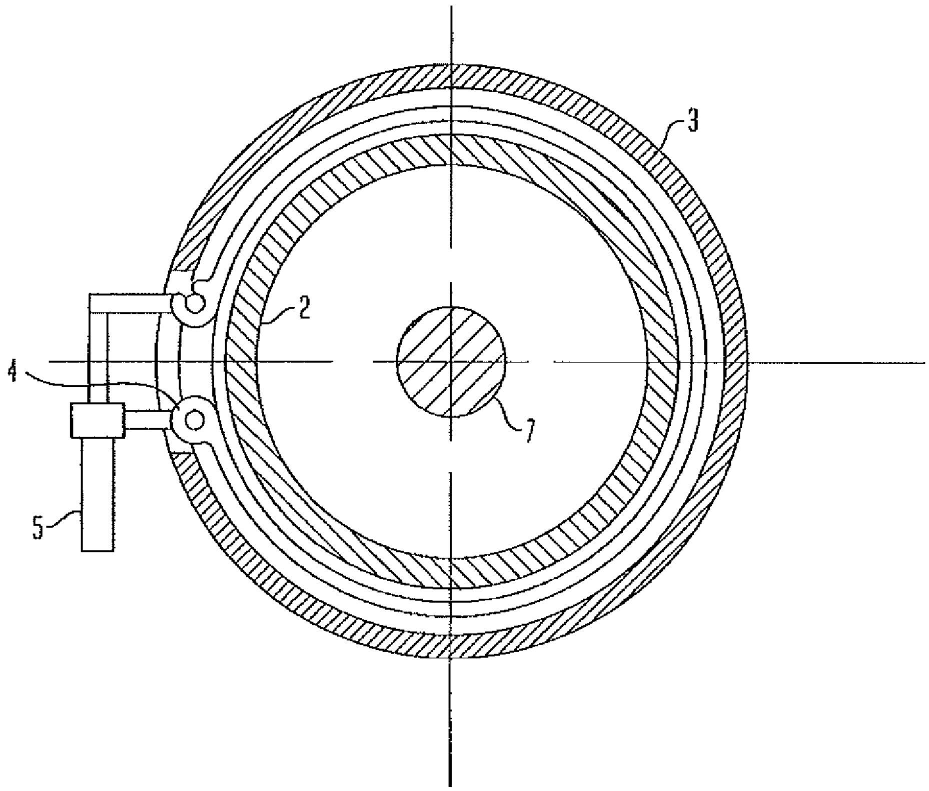
FIG. 3 shows a cross-section of the locking mechanism according to an exemplary embodiment of the present invention along line B-B of FIG. 2A.

Below, the invention is explained in detail in reference to the included drawings, wherein all four FIGS. 1-3 are referred to in equal measure. The locking mechanism according to an exemplary embodiment of the present invention is used to fix a piston rod 7 of a linear actuator 6 in relation to its cylinder 8. Such a linear actuator 6 designed as a hydraulic piston cylinder unit 6 is easily recognizable in FIG. 2*a*. Here, the hydraulic piston cylinder unit 6 mainly includes a cylinder 8 and a piston rod 7, which is seated lengthwisely relocateable in cylinder 8. By pressurizing the hollow space of cylinder 8, the piston rod 7 is moved lengthwisely in well-known manner. As can be seen in FIG. 2*a* and especially well in FIG. 2*b*, a tube jointing sleeve is attached to the exterior circumference of cylinder 8, for example by clamping, which tube jointing sleeve comprises of a plurality of grooves 9 on the side of the external circumference, which are arranged lengthwisely on the cylinder with a certain distance between them. Though in the example shown, the grooves 9 are designed to be on a separate tube jointing sleeve, it is self-evident that the grooves 9 can be incorporated directly into the outer circumference of the cylinder 8 as well.

As is additionally shown in FIG. 2*b*, the piston rod 7 is concentrically surrounded by a so-called dip pipe 2, which is attached to the piston rod 7 at its open end. The dip pipe 2 surrounds the piston rod 7 in such a distance that the cylinder 8 can immerse into this distance when the piston cylinder unit 6 is activated.

The piston rod 7 is connected to the dip pipe 2 via a front wall 11, which seals the dip pipe 2 at one end and in which continuation a lug 12 is designed for linkage of the piston cylinder unit 6.

At the end of the dip pipe 2 sealed front wall 11, the active locking unit is arranged in form of the at least one second locking element 4.

As can be seen best in FIGS. 1 and 3, the at least one second positive locking mechanism is designed in the shown exemplary embodiment as a spring washer clamp 4, which is accommodated in its unlocked position by an annular gap 10, that is formed at the open end of dip pipe 2. This annular gap 10 can, for example, be formed by a rosette bracket 3, which can, for example, be screwed onto a widening at the end of the dip pipe 2. The inner diameter of the spring washer clamp 4 is dimensioned in such a way that in unstretched condition, thus its locking position, it substantially equals the inner diameter of the grooves of the tube jointing sleeve 1.

In order not to lock the piston cylinder unit having the locking mechanism according to the present invention permanently, a small unlocking actuator 5 is provided at the open ends of the spring washer clamp 4, which unlocking actuator is coupled with a power source, which again is coupled with the one, that is operating the piston cylinder unit 6 itself. By activating the unlocking activator 5S, the spring washer clamp 4 is held, against its own reset force, which always tries to move it to its locked position, in unlocked position, in which the spring washer clamp 4 is accommodated by the annular gap 10, so that a free operation of the piston cylinder unit 6 is achieved.

In case that the power source to piston cylinder unit 6 is failing at a point in time, the unlocking actuator can no longer compensate the reset force of spring washer clamp 4, due to the coupling between the power input to the unlocking actuator 5 and the power input of the piston cylinder unit 6, leading to the fact that the spring washer clamp 4 moves from its unlocked position to its locked position, in which it engages with one of the grooves 9 of the tube jointing sleeve 1, so that the piston rod 7 is fixed relatively to the cylinder 8. The correspondingly achieved positive locking connection between the two lugs 12 of the piston cylinder unit 6 securely locks the cylinder and presents a second load path for additional safety.

Figure 4A:
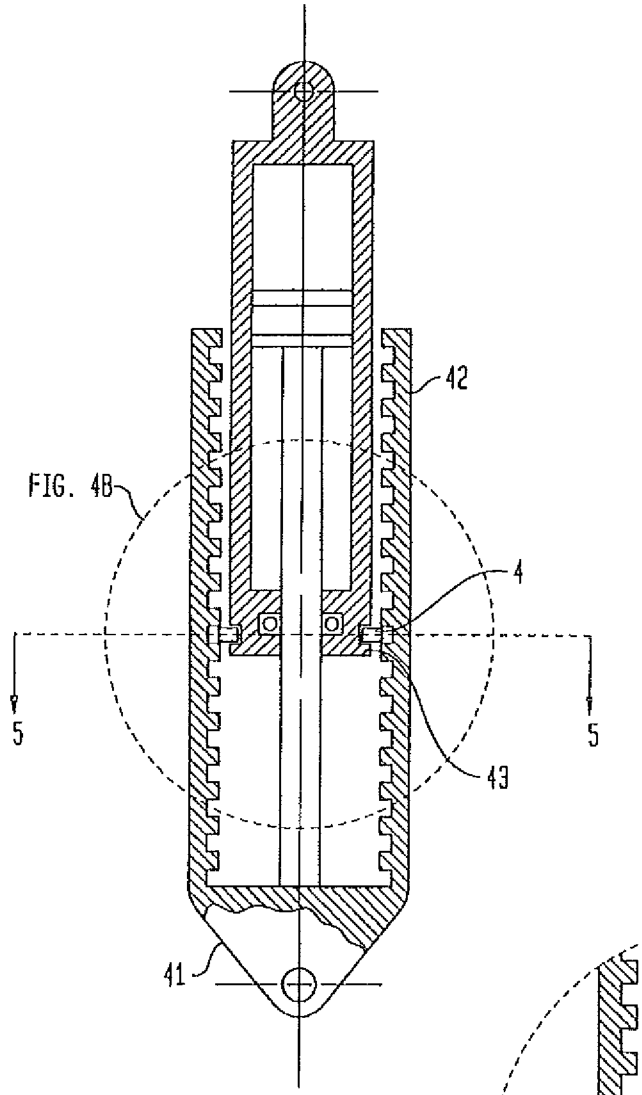
FIG. 4A shows a longitudinal section through a piston cylinder unit equipped with a locking mechanism according to an alternative embodiment of the present invention.
Figure 4B:
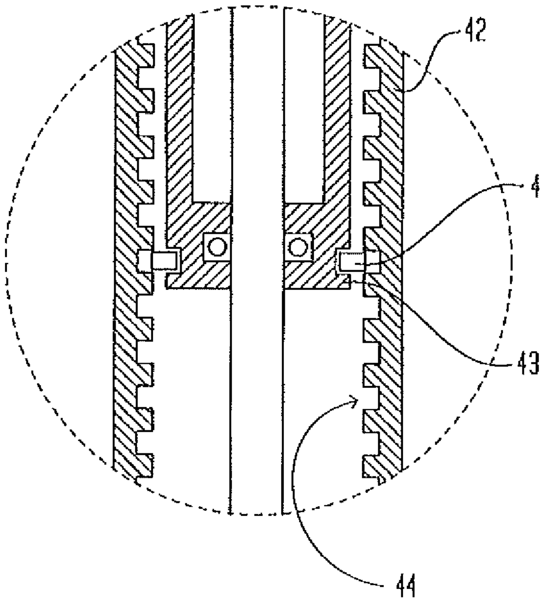
FIG. 4B shows detail 4B of FIG. 4A in an enlarged illustration.
Figure 5:
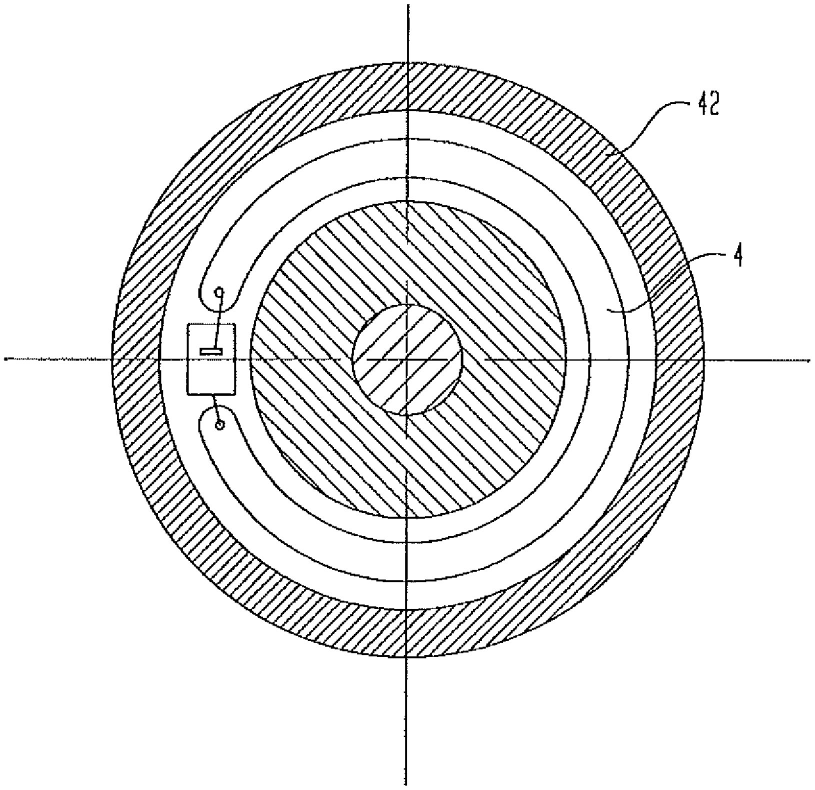
FIG. 5 shows a cross-section of the locking mechanism according to this alternative embodiment of the present invention along line 5-5 of FIG. 4A.
Figure 6:
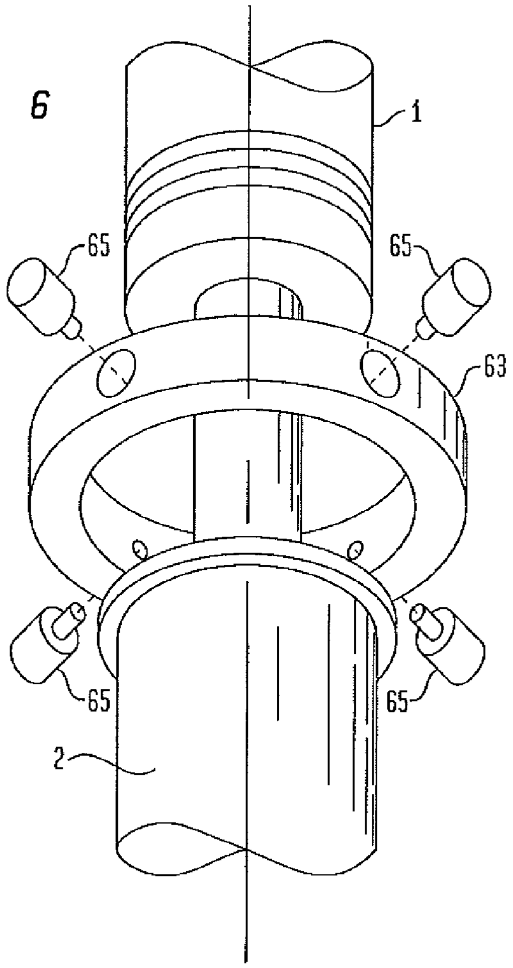
FIG. 6 is an exploded view of a locking mechanism according to another alternative embodiment of the present invention.

According to another embodiment, as shown in FIGS. 4A, 4B, and 5, the at least one second positive locking element 4 is arranged on the outside circumference of a cylinder 43 in the area of the exit of the piston rod, and a plurality of first positive locking elements 44 move together with the piston rod, when activating the linear actuator, and thereby passing the first locking element. The at least one second positive locking element 4 is positively engageable with one of the plurality of first positive locking elements 44 at discrete positions of the piston rod in lengthwise direction, so that the piston rod is fixed relatively to the cylinder.

The locking mechanism according to this embodiment further comprises a dip pipe 42, which is attached to an end of the piston rod, which end is outside of the cylinder 43 situated and which concentrically surrounds the piston rod spaced apart by a certain separation distance. The distance is dimensioned in such a way, that upon activation of the linear actuator the cylinder 43 is immersed in the separation distance.

The dip pipe 42 comprises a closed front wall 41 at one end, by which the piston rod is at least indirectly connected to the dip pipe 42.

The at least one second positive locking element 4 is formed as a spring washer clamp, which positively engages with one of the plurality of grooves 44 when in the locked position.

Figure 7A:
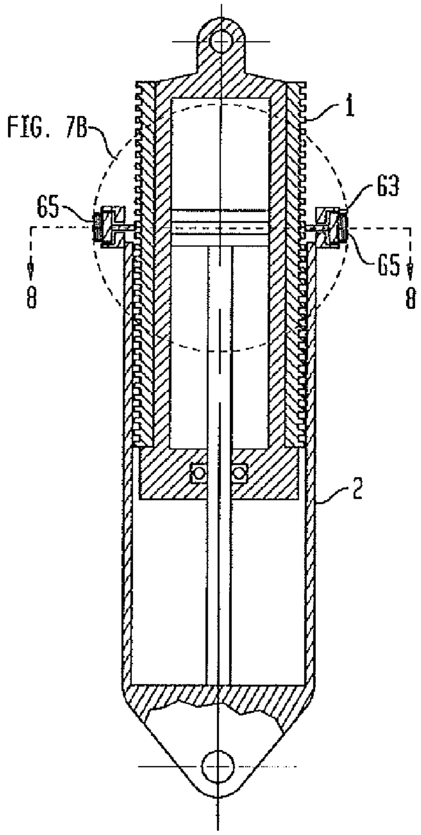
FIG. 7A shows a longitudinal section through a piston cylinder unit equipped with a locking mechanism according to this alternative embodiment of the present invention.
Figure 7B:
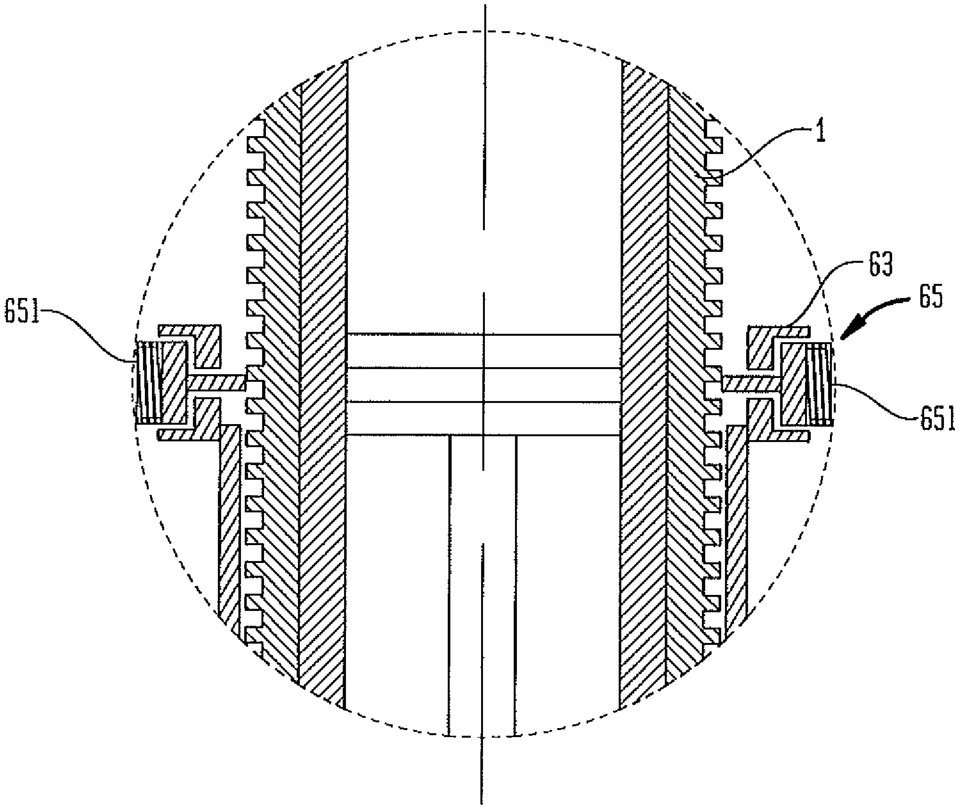
FIG. 7B shows detail 7B of FIG. 7A in an enlarged illustration.
Figure 8:
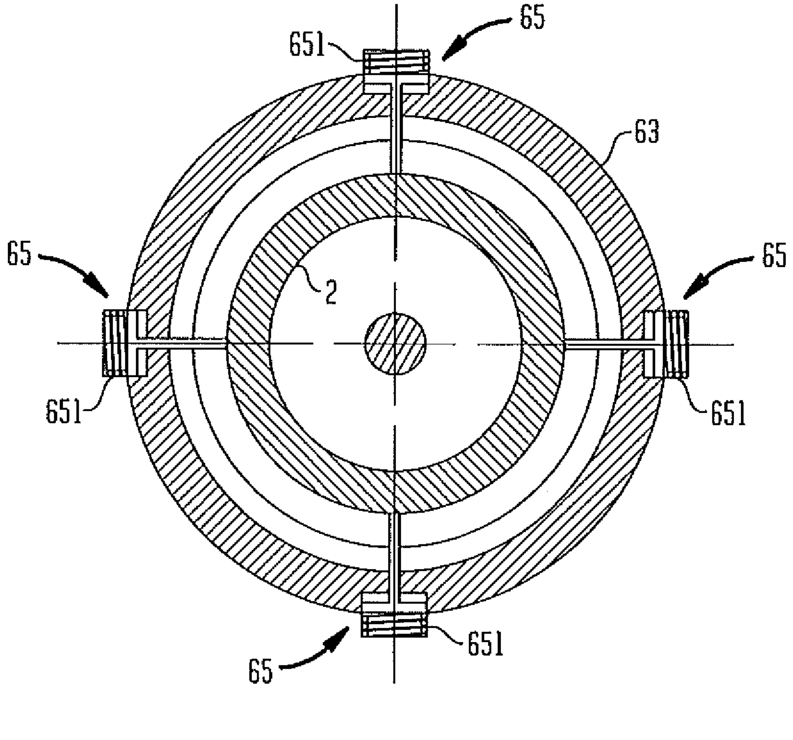
FIG. 8 shows a cross-section of the locking mechanism according to this alternative embodiment of the present invention along line 8-8 of FIG. 7A.

According to a further embodiment, as shown in FIGS. 7A, 7B, and 8, it would be possible as well to provide the second locking element as multiple small piston cylinder units 65, which are, for example, arranged on the outside of the cylinder and supported by a top 63 of the dip pipe 2. The piston cylinder units 65, driven by a spring 651, engage with the grooves of the cylinder in case of an energy failure.

In addition it should be mentioned that "comprising" and "including" does not exclude other elements or steps, and "a" or "one" does not exclude a plural number. Furthermore, it should be mentioned that features or steps which have been described with reference to one of the above embodiments can also be used in combination with other features or steps of other embodiments described above. Reference signs in the claims are not to be interpreted as limitations.

LIST OF REFERENCE FIGURES

1 tube jointing sleeve
2 dip pipe
3 rosette bracket (Halterosette)
4 spring washer clamp
5 unlocking actuator
6 linear actuator
7 piston rod
8 cylinder
9 grooves
10 annular gap
11 front wall
12 lug

The invention claimed is:

1. A locking mechanism for fixing a linear actuator comprising a piston rod and a cylinder, the locking mechanism comprising:

a plurality of first positive locking elements arranged lengthwisely on the outside circumference of the cylinder and in certain distances to one another, at least one second positive locking element configured to move together with the piston rod when the linear actuator is activated, and thereby to pass a segment of the cylinder, wherein the at least one second positive locking element is positively engageable with one of the plurality of first locking elements at discrete positions of the cylinder in lengthwise direction, so that the piston rod is fixed relative to the cylinder, wherein the plurality of first positive locking elements comprises a plurality of grooves surrounding the cylinder on the exterior circumferential side of the cylinder, and wherein the at least one second positive locking element is a spring washer clamp directly positively engaging one of the plurality of grooves when the at least one second positive locking element is in a locked position, wherein the at least one second positive locking element is adapted to assume a locked position, wherein the at least one second positive locking element is engaged with one of the plurality of first positive locking elements to form a positive locking, or assume an unlocked position, wherein the positive locking is suspended, wherein the at least one second positive locking element is adapted to create a reset force trying to move the second locking element from the unlocked position to the locked position;

wherein the spring washer clamp comprises at the open ends thereof an unlocking actuator, by activation of which unlocking actuator the at least one second positive locking element is held in the unlocked position counteracting the reset force; and wherein the activation of the unlocking actuator is performed using a common power input coupled to and operating the unlocking actuator and the linear actuator, so that in case of a failure of the common power input of the linear actuator and of the unlocking actuator, the at least one second positive locking element is moved to the locked position due to the reset force no longer being countered by the deactivated unlocking actuator.

2. The locking mechanism of claim 1, wherein the plurality of grooves are integrally formed in the exterior circumference of the cylinder.

3. The locking mechanism of claim 1, wherein the plurality of grooves are formed in a separate tube jointing sleeve, the inside diameter of which is matched to the outside diameter of the cylinder in such a way that the tube jointing sleeve is attachable to the cylinder.

4. The locking mechanism according to claim 1, further comprising:

a dip pipe attached to an end of the piston rod, which end is outside of the cylinder and which concentrically surrounds the piston rod spaced apart by a separation distance, the dip pipe concentrically surrounds the cylinder, the at least one second positive locking element is accepted in an inner wall of the dip pipe.

5. The locking mechanism of claim 4, wherein the dip pipe comprises a closed front wall at one end, by which the piston rod is indirectly connected to the dip pipe.

6. The locking mechanism of claim 4, wherein the dip pipe, in the area where the dip pipe concentrically surrounds the cylinder, forms an annular gap, in which the spring washer clamp is accepted.

7. A locking mechanism for fixing a linear actuator comprising a piston rod, a cylinder, and a dip pipe having an inner circumference, the locking mechanism comprising:

at least one second positive locking element arranged on the outside circumference of the cylinder in the area of the exit of the piston rod, and a plurality of first positive locking elements configured to move together with the piston rod, when activating the linear actuator, and thereby to pass the at least one second locking element, wherein the at least one second positive locking element is positively engageable with one of the plurality of first positive locking elements at discrete positions of the piston rod in lengthwise direction, so that the piston rod is fixed relative to the cylinder, wherein the plurality of first positive locking elements comprises a plurality of grooves incorporated into the inner circumference of the dip pipe, and wherein the at least one second positive locking element is a spring washer clamp directly positively engaging with one of the plurality of grooves when the at least one second positive locking element is in a locked position, wherein the at least one second positive locking element is adapted to either assume a locked position, wherein the at least one second positive locking element is engaged with one of the plurality of first locking elements to form a positive locking, or to alternatively assume an unlocked position, wherein the positive locking is suspended, wherein the at least one second positive locking element is adapted to create a reset force, which tries to move the at least one second positive locking element from the unlocked position to the locked position, wherein the spring washer clamp comprises at the open ends thereof an unlocking actuator, by activation of which unlocking actuator the at least one second positive locking element is held in the unlocked position counteracting the reset force; and wherein the activation of the unlocking actuator is performed using a common power input coupled to and operating the unlocking actuator and the linear actuator, so that in case of a failure of the common power input of the linear actuator and of the unlocking actuator, the at least one second positive locking element is moved to the locked position due to the reset force no longer being countered by the deactivated unlocking actuator.

8. The locking mechanism according to claim 7, dip pipe is attached to an end of the piston rod, which end is situated outside of the cylinder and which concentrically surrounds the piston rod spaced apart by a separation distance, wherein the separation distance is dimensioned in such a way, that upon activation of the linear actuator the cylinder is immersed in the separation distance.

9. The locking mechanism according to claim 8, wherein the dip pipe comprises a closed front wall at one end, by which the piston rod is at least indirectly connected to the dip pipe.

10. The locking mechanism according to claim 8, wherein the cylinder, in an area where the cylinder is overlapping with the dip pipe, forms an annular gap, in which the spring washer clamp is accepted.

* * * * *